United States Patent
Kim

(10) Patent No.: US 12,358,553 B2
(45) Date of Patent: Jul. 15, 2025

(54) ELECTRIC POWER STEERING APPARATUS AND METHOD OF OPERATING THE SAME

(71) Applicant: HL MANDO CORPORATION, Pyeongtaek-si (KR)

(72) Inventor: Dongcheol Kim, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 89 days.

(21) Appl. No.: 18/140,243

(22) Filed: Apr. 27, 2023

(65) Prior Publication Data

US 2024/0239404 A1  Jul. 18, 2024

(30) Foreign Application Priority Data

Jan. 12, 2023  (KR) .................. 10-2023-0004874

(51) Int. Cl.
B62D 6/04 (2006.01)
B62D 5/04 (2006.01)

(52) U.S. Cl.
CPC ........... B62D 5/0484 (2013.01); B62D 5/049 (2013.01)

(58) Field of Classification Search
CPC .... B62D 5/0484; B62D 5/049; B62D 5/0481; B62D 6/00; H04L 12/40071; H04L 12/66; H04L 2012/40215; H04L 2012/40273
See application file for complete search history.

(56) References Cited

U.S. PATENT DOCUMENTS

| 11,818,235 | B1* | 11/2023 | Teshler | H04L 45/72 |
| 2018/0113836 | A1* | 4/2018 | Hirata | H04L 69/40 |
| 2023/0006914 | A1* | 1/2023 | Kim | H04L 45/02 |
| 2023/0148249 | A1* | 5/2023 | Hoshino | B60H 1/3208 701/23 |
| 2023/0315440 | A1* | 10/2023 | Clark | G06F 11/0751 |
| 2023/0419743 | A1* | 12/2023 | Andreason | G07C 5/085 |

FOREIGN PATENT DOCUMENTS

KR  10-2022-0007741 A  1/2022
WO  2020/260050 A1  12/2020

OTHER PUBLICATIONS

Office Action issued on Dec. 4, 2024 for corresponding Korean Patent Application No. 10-2023-0004874 along with an English translation (8 pages).

* cited by examiner

Primary Examiner — Joseph J Dallo
(74) Attorney, Agent, or Firm — Hauptman Ham, LLP

(57) ABSTRACT

The present disclosure normally controls steering of a vehicle by each ECU even when failure occurs in an Inter Micro CAN (IMC) network utilized for communication between Electronic Control Units (ECUs) in a redundancy system of electric power steering (EPS), thereby stably controlling the steering and reducing unwieldiness to the driver.

13 Claims, 4 Drawing Sheets

ELECTRIC POWER STEERING APPARATUS AND METHOD OF OPERATING THE SAME

CROSS-REFERENCE TO RELATED APPLICATIONS

This application claims benefit and priority to Korean Patent Application No. 10-2023-0004874, filed on Jan. 12, 2023, with the Korean Intellectual Property Office, the disclosure of which is incorporated herein in its entirety by reference.

TECHNICAL FIELD

The present disclosure relates to an electric power steering apparatus and a method of operating the same, and more particularly to an apparatus and method of controlling an Electric Power Steering (EPS) system to operate normally in the event of a communication failure within the EPS system.

BACKGROUND

In the event of failure of an Inter Micro CAN (IMC) network used for communication between Electronic Control Units (ECUs) in the redundancy system of Electric Power Steering (EPS), normal operation of the EPS system is not possible, which may lead to heterogeneity. That is, in the EPS system in the related art, whether the communication using the IMC network between the ECUs is normal affects steering control. In the event of an IMC network failure, each ECU cannot know the torque sensing values and motor output values of the other ECUs, so each ECU operates in an independent control mode which controls steering by using only information that each ECU knows. However, in the independent control mode, there is a difference between the outputs of the ECUs, so that there is a problem in making the driver feel uncomfortable, but also reducing safety due to limitation in precise steering.

SUMMARY

The present disclosure is conceived in response to the background art, and has been made in an effort to provide an electric power steering apparatus and a method of operating the same, in which each ECU normally controls steering of a vehicle even when failure occurs in an Inter Micro CAN (IMC) network utilized for communication between Electronic Control Units (ECUs) in a redundancy system of electric power steering (EPS).

Other unstated objects of the present disclosure may be further contemplated to the extent that they can be readily inferred from the detailed description below and the effects.

An exemplary embodiment of the present disclosure provides an Electric Power Steering (EPS) apparatus connected to a central gateway Electronic Control Unit (ECU) mounted in a vehicle, the EPS apparatus including: a first ECU for individually controlling steering of the vehicle based on first information; and a second ECU for individually controlling steering of the vehicle based on second information, in which when an inter micro CAN (IMC) network is operated normally, the first ECU and the second ECU transmit and receive messages directly through the IMC network, and when the IMC network is not operated normally, the first ECU and the second ECU transmit and receive the messages by using the central gateway ECU, and control the steering of said vehicle by using messages received from another ECU.

The first ECU may be connected to the central gateway ECU through a first vehicle Controller Area Network (CAN), and be connected to the second ECU through the IMC network, and directly receive a second message from the second ECU through the IMC network when the IMC network is operated normally, and receive the second message from the central gateway ECU through the first vehicle CAN network when the IMC network is not operated normally, and control the steering of the vehicle based on the second message and the first information, and the second ECU may be connected with the central gateway ECU through a second vehicle CAN network different from the first vehicle CAN network, be connected with the first ECU through the IMC network, directly receive a first message from the first ECU through the IMC network when the IMC network is operated normally, and receive the first message from the central gateway ECU through the second vehicle CAN network when the IMC network is not operated normally, and control the steering of the vehicle based on the first message and the second information.

When the IMC network is not operated normally, at least one of the first ECU and the second ECU may request message relay from the central gateway ECU.

When at least one of the first ECU and the second ECU does not receive a message transmitted from another ECU through the IMC network according to a predetermined cycle, at least one of the first ECU and the second ECU may determine that the IMC network is not operated normally.

When a message received from the another ECU differs from a predetermined message format, at least one of the first ECU and the second ECU may determine that the IMC network is not operating normally.

When the message relay is made through the central gateway ECU within a predetermined time after the message relay is requested to the central gateway ECU, the first ECU may control the steering of the vehicle based on the first information and the second message received from the central gateway ECU through the first vehicle CAN network, and when the message relay is not made through the central gateway ECU within the predetermined time, the first ECU may control the steering of the vehicle based only on the first information, and when the message relay is made through the central gateway ECU within the predetermined time after the message relay is requested to the central gateway ECU, the second ECU may control the steering of the vehicle based on the second information and the first message received from the central gateway ECU through the second vehicle CAN network, and when the message relay is not made through the central gateway ECU within the predetermined time, the second ECU may control the steering of the vehicle based only on the second information.

The first ECU may control the steering of the vehicle based only on the first information after the message relay is requested to the central gateway ECU, and when the message relay is made through the central gateway ECU, the first ECU may control the steering of the vehicle based on the first information and the second message received from the central gateway ECU through the first vehicle CAN network, and the second ECU may control the steering of the vehicle based only on the second information after the message relay is requested to the central gateway ECU, and when the message relay is made through the central gateway ECU, the second ECU may control the steering of the vehicle based on the second information and the first message received from the central gateway ECU through the second vehicle CAN network.

The first information may include first channel information received by the first ECU through the first vehicle CAN network, first torsion force information received by the first ECU from a torque sensor, and first motor output information received by the first ECU from a motor, and the second information may include second channel information received by the second ECU through the second vehicle CAN network, second torsion force information received by the second ECU from a torque sensor, and second motor output information received by the second ECU from a motor.

When the IMC network is operated normally, the first ECU may transmit the first message including the first channel information, the first torsion force information, and the first motor output information to the second ECU through the IMC network, and when the IMC network is not operated normally, the first ECU may transmit the first message to the central gateway ECU through the first vehicle CAN network, and when the IMC network is operated normally, the second ECU may transmit the second message including the second channel information, the second torsion force information, and the second motor output information to the first ECU through the IMC network, and when the IMC network is not operated normally, the second ECU may transmit the second message to the central gateway ECU through the second vehicle CAN network.

The first channel information may include speed information of the vehicle, and is different from the second channel information.

Another exemplary embodiment of the present disclosure provides a method of operating an Electric Power Steering (EPS) apparatus connected to a central gateway Electronic Control Unit (ECU) mounted in a vehicle, the method including: individually controlling, by a first ECU, steering of the vehicle based on first information; and individually controlling, by a second ECU, steering of the vehicle based on second information, in which when an inter micro CAN (IMC) network is operated normally, the first ECU and the second ECU transmit and receive messages directly through the IMC network, and when the IMC network is not operated normally, the first ECU and the second ECU transmit and receive the messages by using the central gateway ECU, and control the steering of said vehicle by using messages received from another ECU.

The first ECU may be connected to the central gateway ECU through a first vehicle Controller Area Network (CAN), and be connected to the second ECU through the IMC network, and the controlling by the first ECU may include directly receiving a second message from the second ECU through the IMC network when the IMC network is operated normally, and receiving the second message from the central gateway ECU through the first vehicle CAN network when the IMC network is not operated normally, and controlling the steering of the vehicle based on the second message and the first information, and the second ECU may be connected with the central gateway ECU through a second vehicle CAN network different from the first vehicle CAN network, be connected with the first ECU through the IMC network, and the controlling by the second ECU may include directly receiving a first message from the first ECU through the IMC network when the IMC network is operated normally, and receiving the first message from the central gateway ECU through the second vehicle CAN network when the IMC network is not operated normally, and controlling the steering of the vehicle based on the first message and the second information.

The method may further include, requesting, by at least one of the first ECU and the second ECU, message relay from the central gateway ECU when the IMC network is not operated normally.

The requesting of the message relay may include, when at least one of the first ECU and the second ECU does not receive a message transmitted from another ECU through the IMC network according to a predetermined cycle, determining that the IMC network is not operated normally.

The requesting of the message relay may include, when a message received from the another ECU differs from a predetermined message format, determining that the IMC network is not operating normally.

The controlling by the first ECU may include, when the message relay is made through the central gateway ECU within a predetermined time after the message relay is requested to the central gateway ECU, controlling the steering of the vehicle based on the first information and the second message received from the central gateway ECU through the first vehicle CAN network, and when the message relay is not made through the central gateway ECU within the predetermined time, controlling the steering of the vehicle based only on the first information, and the controlling by the second ECU may include, when the message relay is made through the central gateway ECU within the predetermined time after the message relay is requested to the central gateway ECU, controlling the steering of the vehicle based on the second information and the first message received from the central gateway ECU through the second vehicle CAN network, and when the message relay is not made through the central gateway ECU within the predetermined time, controlling the steering of the vehicle based only on the second information.

The controlling by the first ECU may include controlling the steering of the vehicle based only on the first information after the message relay is requested to the central gateway ECU, and when the message relay is made through the central gateway ECU, controlling the steering of the vehicle based on the first information and the second message received from the central gateway ECU through the first vehicle CAN network, and the controlling by the second ECU may include controlling the steering of the vehicle based only on the second information after the message relay is requested to the central gateway ECU, and controlling the steering of the vehicle based on the second information and the first message received from the central gateway ECU through the second vehicle CAN network when the message relay is made through the central gateway ECU.

The first information may include first channel information received by the first ECU through the first vehicle CAN network, first torsion force information received by the first ECU from a torque sensor, and first motor output information received by the first ECU from a motor, and the second information may include second channel information received by the second ECU through the second vehicle CAN network, second torsion force information received by the second ECU from a torque sensor, and second motor output information received by the second ECU from a motor.

The method may further include, transmitting, by the first ECU, the first message including the first channel information, the first torsion force information, and the first motor output information to the second ECU through the IMC network when the IMC network is operated normally, and transmitting by the first ECU, the first message to the central gateway ECU through the first vehicle CAN network when the IMC network is not operated normally, and transmitting, by the second ECU, the second message including the second channel information, the second torsion force information, and the second motor output information to the first ECU through the IMC network when the IMC network is operated normally, and transmitting, by the second ECU, the second message to the central gateway ECU through the second vehicle CAN network when the IMC network is not operated normally.

According to the electric power steering apparatus and the method of operating the same, even when failure occurs in an Inter Micro CAN (IMC) network utilized for communication between Electronic Control Units (ECUs) in a redundancy system of electric power steering (EPS), each ECU normally controls steering of a vehicle, thereby stably controlling the steering and reducing unwieldiness to the driver.

The effects of the present disclosure are not limited to those mentioned above, and other effects not mentioned will be apparent to those skilled in the art from the following description.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
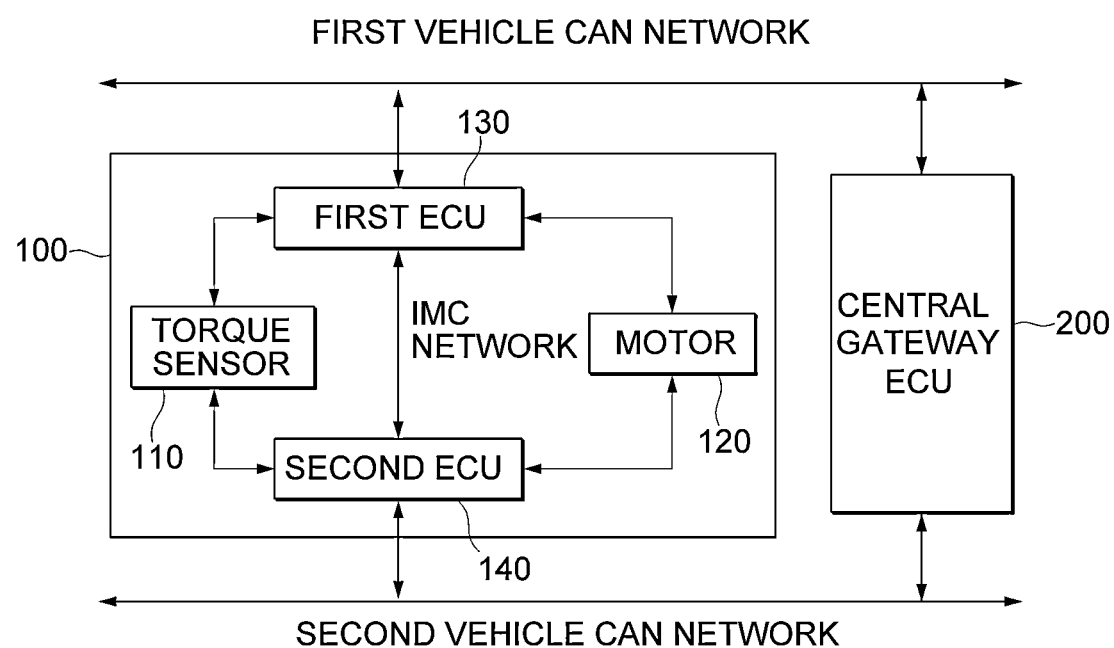
FIG. 1 is a block diagram for illustrating an electric power steering apparatus according to an exemplary embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an exemplary embodiment of the present disclosure will be described in detail with reference to the accompanying drawings. The advantages and characteristics of the present disclosure, and a method for achieving the advantages and characteristics will become clear by referring to the exemplary embodiment, which is described below in detail, together with the accompanying drawings. However, the present disclosure is not limited to exemplary embodiments disclosed herein but will be implemented in various forms, and the exemplary embodiments are provided so that the present disclosure is completely disclosed, and a person of ordinary skilled in the art can fully understand the scope of the present disclosure, and the present disclosure will be defined only by the scope of the appended claims. Throughout the specification, the same reference numeral indicates the same constituent element.

Unless otherwise defined, all of the terms (including technical and scientific terms) used in the present specification may be used as a meaning commonly understandable by those skilled in the art. Further, terms defined in a generally used dictionary shall not be construed as being ideal or excessive in meaning unless they are clearly defined specially.

In the present specification, the terms "first," "second," and the like are intended to distinguish one component from another component and are not intended to limit the scope of the claims. For example, a first component may be named as a second component, and similarly, a second component may be named as a first component.

In this specification, identifiers (for example, a, b, and c) for each operation are used for convenience of description only, and the identifiers do not describe the order of the operations, and the operations may occur in any order other than that specified unless the context clearly indicates a particular order. That is, this means that each operation may occur in the same order as specified, may be performed substantially simultaneously, or may be performed in reverse order.

In the present specification, expressions, such as "has," "may have," "includes," or "may include" refer to the presence of a corresponding feature (for example, a numerical value, function, operation, or constituent element, such as a component) and do not exclude the presence of additional features.

The term " . . . unit" used in the present exemplary embodiment refers to software or a hardware component, such as a Field Programmable Gate Array (FPGA) or an Application Specific Integrated Circuit (ASIC), and the . . . unit" serves a specific role. However, the " . . . unit" is not limited to software or hardware. The " . . . unit" may also be configured to be included in an addressable storage medium, and may be configured to reproduce one or more processors. Thus, in one example, " . . . unit" includes constituent elements, such as software constituent elements, object-oriented software constituent elements, class constituent elements, and task constituent elements, processes, functions, properties, procedures, subroutines, segments of program code, drivers, firmware, microcode, circuits, data structures, and variables. The components and the function provided in the " . . . unit" may be combined into a smaller number of components and " . . . unit" or further separated into additional components and "units".

Hereinafter, with reference to the accompanying drawings, an exemplary embodiment of an electric power steering apparatus and a method of operating the same according to the present disclosure will be described in detail.

First, an electric power steering apparatus according to an exemplary embodiment of the present disclosure will be described with reference to FIGS. 1 to 3.

Figure 2:
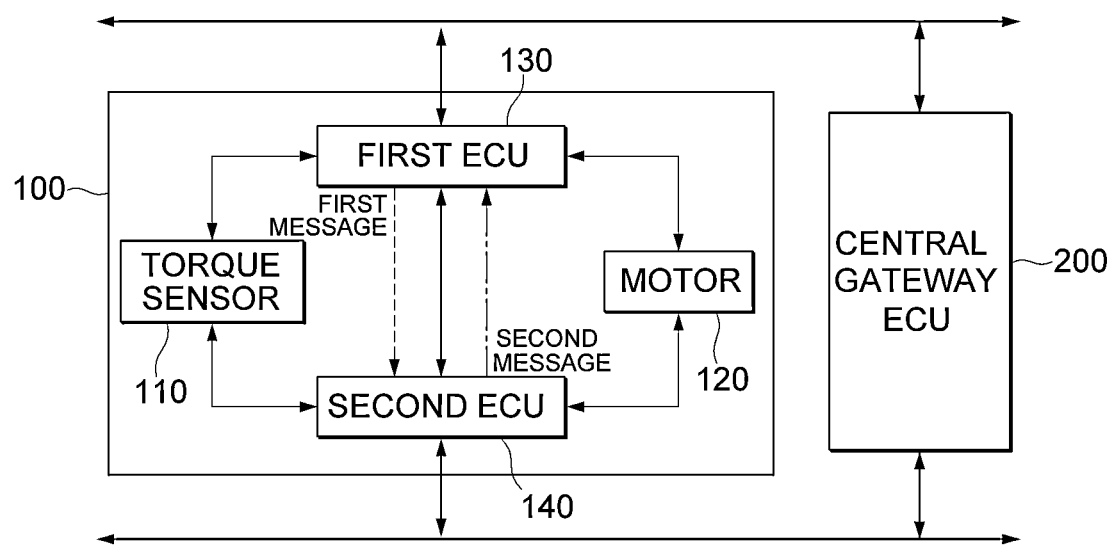
FIG. 2 is a diagram for illustrating a message transmitting and receiving operation when an Inter Micro CAN (IMC) network between Electronic Control Units (ECUs) of the electric power steering apparatus shown in FIG. 1 is normally operated.
Figure 3:
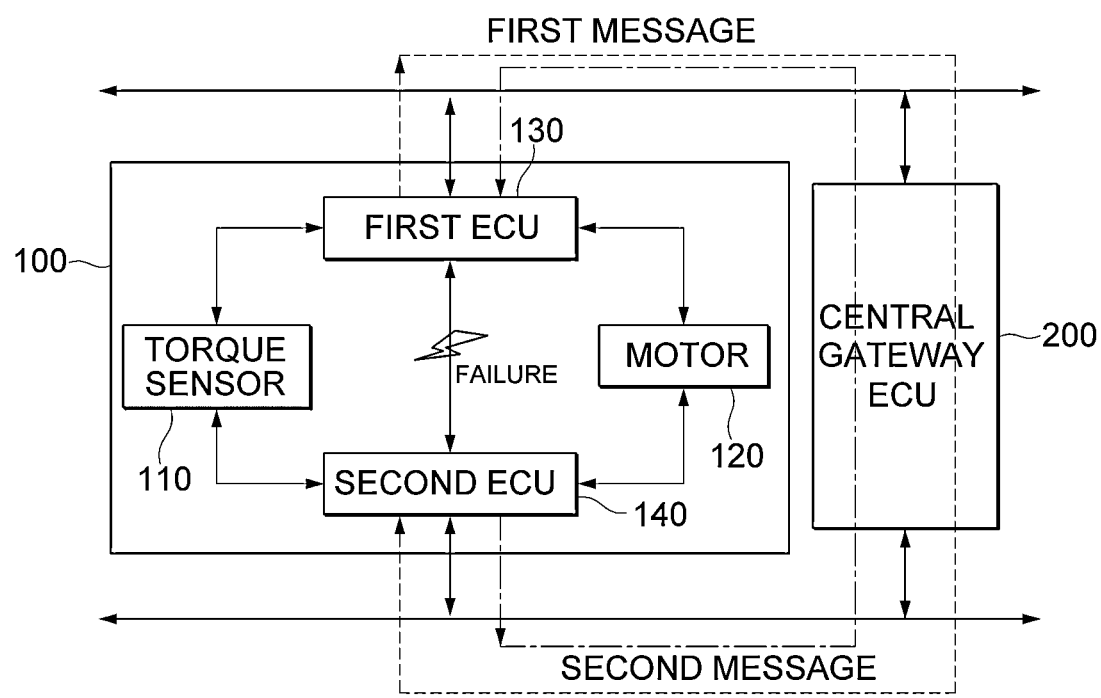
FIG. 3 is a diagram for illustrating a message transmitting and receiving operation when an IMC network between ECUs of the electric power steering apparatus shown in FIG. 1 is not normally operated.

FIG. 1 is a block diagram for illustrating an electric power steering apparatus according to an exemplary embodiment of the present disclosure, FIG. 2 is a diagram for illustrating a message transmitting and receiving operation when an Inter Micro CAN (IMC) network between Electronic Control Units (ECUs) of the electric power steering apparatus shown in FIG. 1 is normally operated, and FIG. 3 is a diagram for illustrating a message transmitting and receiving operation when an IMC network between ECUs of the electric power steering apparatus shown in FIG. 1 is not normally operated.

Referring to FIG. 1, an electric power steering apparatus 100 according to an exemplary embodiment of the present disclosure is connected to a central gateway ECU 200 mounted within a vehicle, such that each ECU 130 and 140 may normally control the steering of the vehicle even when failure occurs in an IMC network utilized for communication between the ECUs 130 and 140 in the redundancy system of the electric power steering (EPS).

Here, the central gateway ECU 200 is connected to all vehicle CAN networks within the vehicle to perform network management functions and the like.

That is, the electric power steering apparatus 100 transmits and receives messages directly between the ECUs 130 and 140 through the IMC network when the IMC network is operated normally, and transmits and receives messages by using the central gateway ECU 200 when the IMC network is not operated normally, and each ECU 130 or 140 may control the steering of the vehicle by using the messages received from another ECU.

Accordingly, even when failure occurs in the IMC network utilized for communication between the ECUs, the electric power steering apparatus 100 may stably control the steering and reduce unwieldiness to the driver.

To this end, the electric power steering apparatus 100 may include a torque sensor 110, a motor 120, a first ECU 130 connected with the central gateway ECU 200 through a first vehicle CAN network, and a second ECU 140 connected with the central gateway ECU 200 through a second vehicle CAN network that is different from the first vehicle CAN network.

The torque sensor 110 may measure a torsion force according to the motion of the steering wheel.

Under the control of the first ECU 130 and/or the second ECU 140, the motor 120 may drive the motor 120 to adjust the steering of the vehicle.

The first ECU 130 is connected to the second ECU 140 through the IMC network and may individually control the steering of the vehicle based on first information.

Here, the first information may include first channel information received by the first ECU 130 through the first vehicle CAN network, first torsion force information received by the first ECU 130 from the torque sensor 110, and first motor output information received by the first ECU 130 from the motor 120. The first channel information is information received through the first vehicle CAN network and may include, for example, speed information of the vehicle, first controller information for advanced driver assistance systems (ADAS), and the like, and may be different from second channel information, which is information received through the second vehicle CAN network.

More specifically, as shown in FIG. 2, when the IMC network is operated normally, the first ECU 130 may transmit a first message to the second ECU 140 through the IMC network. Here, the first message may include first channel information, first torsion force information, and first motor output information. Further, as shown in FIG. 2, when the IMC network is operated normally, the first ECU 130 may directly receive the second message from the second ECU 140 through the IMC network.

On the other hand, as shown in FIG. 3, when the IMC network is not operated normally due to failure of the IMC network, and the like, the first ECU 130 may transmit the first message to the central gateway ECU 200 through the first vehicle CAN network. The central gateway ECU 200 may then transmit the first message to the second ECU 140 through the second vehicle CAN network. Further, as shown in FIG. 3, when the IMC network is not operated normally, the first ECU 130 may receive the second message from the central gateway ECU 200 through the first vehicle CAN network.

In this case, the first ECU 130 may request a message relay from the central gateway ECU 200 when the IMC network is not operated normally. In other words, when the first ECU 130 does not receive the second message, which is a message transmitted from another ECU, the second ECU 140, through the IMC network according to a predetermined cycle, the first ECU 130 may determine that the IMC network is not operated normally. Furthermore, the first ECU 130 may also determine that the IMC network is not operated normally when the second message, which is the message received from the another ECU, the second ECU 140, differs from a predetermined message format.

Then, the first ECU 130 may control the steering of the vehicle based on the second message and the first information. In other words, the first ECU 130 may control the steering of the vehicle by using not only the information that the firsts ECU 130 knows, but also the information provided from the second ECU 140.

In this case, when the message relay is made through the central gateway ECU 200 within a predetermined time after the first ECU 130 and/or the second ECU 140 request the message relay from the central gateway ECU 200, the first ECU 130 may control the steering of the vehicle based on the first information and the second message received from the central gateway ECU 200 through the first vehicle CAN network. On the other hand, when no message relay is made through the central gateway ECU 200 within the predetermined time, the first ECU 130 may determine that the central gateway ECU 200 and/or the first vehicle CAN network is abnormal, and may control the steering of the vehicle based only on the first information.

After the first ECU 130 and/or the second ECU 140 request the message relay from the central gateway ECU 200, the first ECU 130 may control the steering of the vehicle based only on the first information. Then, when the message relay is made through the central gateway ECU 200, the first ECU 130 may control the steering of the vehicle based on the first information and the second message received from the central gateway ECU 200 through the first vehicle CAN network.

The second ECU 140 is connected to the first ECU 130 via the IMC network and may individually control the steering of the vehicle based on the second information.

Here, the second information may include second channel information received by the second ECU 140 through the second vehicle CAN network, second torsion force information received by the second ECU 140 from the torque sensor 110, and second motor output information received by the second ECU 140 from the motor 120. The second channel information is information received through the second vehicle CAN network, which may include second controller information and the like for an Advanced Driver Assistance System (ADAS), and may consist of information different from the first channel information, which is the information received through the first vehicle CAN network.

More specifically, the second ECU 140 may transmit the second message to the first ECU 130 through the IMC network when the IMC network is operated normally, as illustrated in FIG. 2. Here, the second message may include second channel information, second torsion force information, and second motor output information. Further, as shown in FIG. 2, when the IMC network is operated normally, the second ECU 140 may directly receive the first message from the first ECU 130 through the IMC network.

On the other hand, as shown in FIG. 3, when the IMC network is not operated normally due to failure of the IMC network, and the like, the second ECU 140 may transmit the second message to the central gateway ECU 200 through the second vehicle CAN network. The central gateway ECU 200 may then transmit the second message to the first ECU 130 through the first vehicle CAN network. Further, as shown in FIG. 3, when the IMC network is not operated normally, the second ECU 140 may receive the first message from the central gateway ECU 200 through the second vehicle CAN network.

In this case, the second ECU 140 may request a message relay from the central gateway ECU 200 when the IMC network is not operated normally. In other words, when the second ECU 140 does not receive the first message, which is a message transmitted from another ECU, the first ECU 130, through the IMC network according to a predetermined cycle, the second ECU 140 may determine that the IMC network is not operated normally. Further, the second ECU 140 may also determine that the IMC network is not operated normally when the first message, which is a message received from the another ECU, the first ECU 130, is different from the predetermined message format.

Then, the second ECU 140 may control the steering of the vehicle based on the first message and the second information. In other words, the second ECU 140 may control the steering of the vehicle by using not only the information that the second ECU 140 knows, but also the information provided from the first ECU 130.

In this case, when the message relay is made through the central gateway ECU 200 within a predetermined time after the first ECU 130 and/or the second ECU 140 request the message relay from the central gateway ECU 200, the second ECU 140 may control the steering of the vehicle based on the second information and the first message received from the central gateway ECU 200 through the second vehicle CAN network. On the other hand, when no message relay is made through the central gateway ECU 200 within the predetermined time, the second ECU 140 may determine that the central gateway ECU 200 and/or the first vehicle CAN network is abnormal, and may control the steering of the vehicle based only on the second information.

After the first ECU 130 and/or the second ECU 140 request the message relay from the central gateway ECU 200, the second ECU 140 may control the steering of the vehicle based only on the second information. Then, when the message relay is made through the central gateway ECU 200, the second ECU 140 may control the steering of the vehicle based on the second information and the first message received from the central gateway ECU 200 through the second vehicle CAN network.

Figure 4:
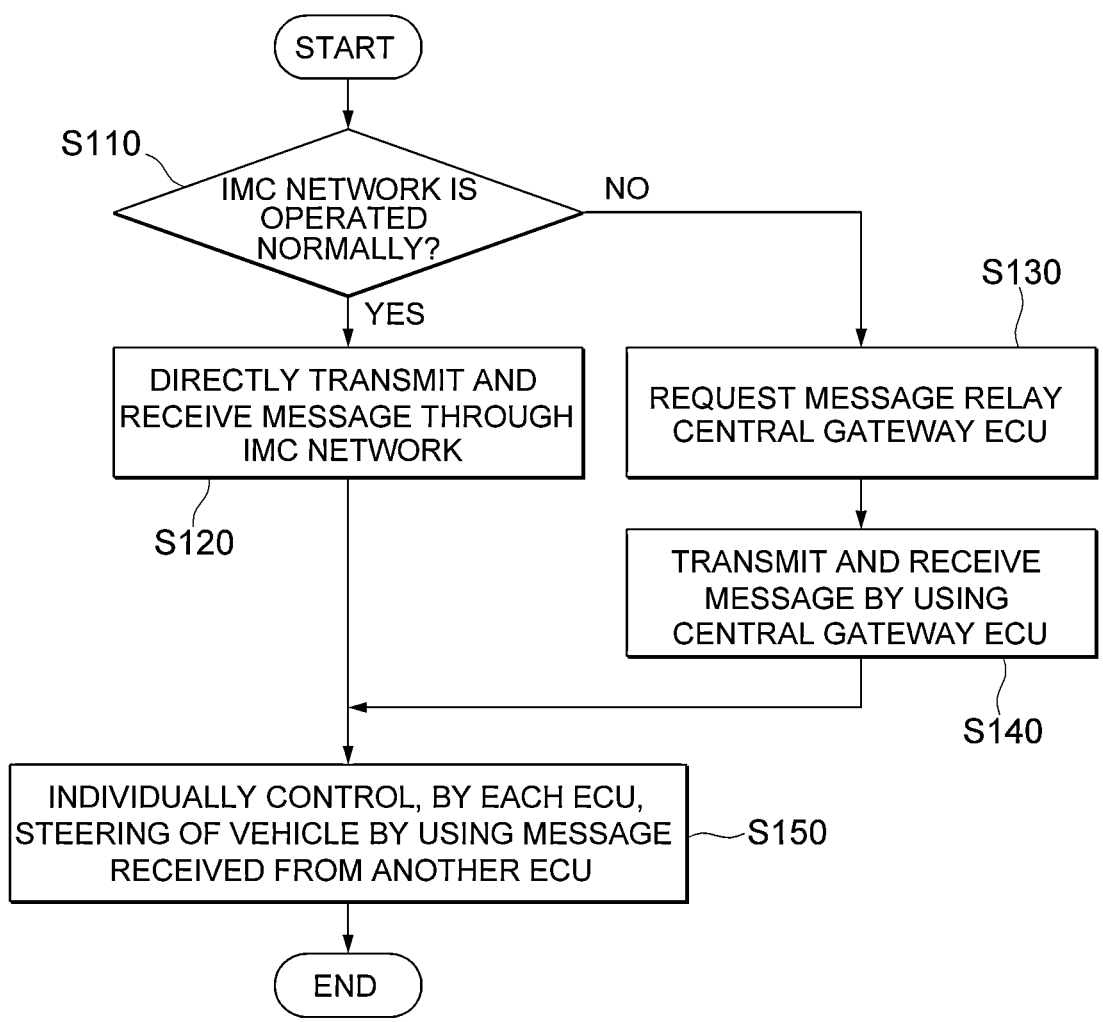
FIG. 4 is a flow diagram for illustrating a method of operating the electric power steering apparatus according to an exemplary embodiment of the present disclosure.

Referring now to FIG. 4, a method of operating the electric power steering apparatus according to an exemplary embodiment of the present disclosure will be described.

FIG. 4 is a flow diagram for illustrating a method of operating the electric power steering apparatus according to an exemplary embodiment of the present disclosure.

Referring to FIG. 4, when the IMC network is operated normally (S110—Y), the electric power steering apparatus 100 may transmit and receive a message directly through the IMC network (S120).

That is, the first ECU 130 may transmit the first message to the second ECU 140 through the IMC network. Further, the first ECU 130 may receive the second message directly from the second ECU 140 through the IMC network.

Then, the second ECU 140 may transmit the second message to the first ECU 130 through the IMC network. Further, the second ECU 140 may receive the first message directly from the first ECU 130 through the IMC network.

On the other hand, when the IMC network is not operated normally (S110—N), the electric power steering apparatus 100 may request message relay from the central gateway ECU 200 (S130).

Here, when the IMC network is not operated normally, the first ECU 130 and/or the second ECU 140 may request the message relay from the central gateway ECU 200. That is, when the first ECU 130 and/or the second ECU 140 does not receive a message (a first message or a second message) transmitted from the another ECU 130 or 140 through the IMC network according to a predetermined cycle, the first ECU 130 and/or the second ECU 140 may determine that the IMC network is not operated normally. Further, when the message (first message or second message) received from the another ECU 130 or 140 is different from a predetermined message format, the first ECU 130 and/or the second ECU 140 may determine that the IMC network is not operated normally.

The electric power steering apparatus 100 may then transmit and receive the message by using the central gateway ECU 200 (S140).

That is, the first ECU 130 may transmit the first message to the central gateway ECU 200 through the first vehicle CAN network. The central gateway ECU 200 may then transmit the first message to the second ECU 140 through the second vehicle CAN network. Further, the first ECU 130 may receive the second message from the central gateway ECU 200 through the first vehicle CAN network.

The second ECU 140 may then transmit the second message to the central gateway ECU 200 through the second vehicle CAN network. The central gateway ECU 200 may then transmit the second message to the first ECU 130 through the first vehicle CAN network. Further, the second ECU 140 may receive the first message from the central gateway ECU 200 through the second vehicle CAN network.

Thereafter, the electric power steering apparatus 100 may individually control the steering of the vehicle by using the message received by each of the ECUs 130 and 140 from the another ECU 130 or 140 (S150).

That is, the first ECU 130 may control the steering of the vehicle based on the second message and the first information.

In this case, when the message relay is made through the central gateway ECU 200 within a predetermined time after the first ECU 130 and/or the second ECU 140 request the message relay from the central gateway ECU 200, the first ECU 130 may control the steering of the vehicle based on the first information and the second message received from the central gateway ECU 200 through the first vehicle CAN network. On the other hand, when no message relay is made through the central gateway ECU 200 within the predetermined time, the first ECU 130 may determine that the central gateway ECU 200 and/or the first vehicle CAN network is abnormal, and may control the steering of the vehicle based only on the first information.

After the first ECU 130 and/or the second ECU 140 request the message relay from the central gateway ECU 200, the first ECU 130 may control the steering of the vehicle based only on the first information. Then, when the message relay is made through the central gateway ECU 200, the first ECU 130 may control the steering of the vehicle based on the first information and the second message received from the central gateway ECU 200 through the first vehicle CAN network.

Then, the second ECU 140 may control the steering of the vehicle based on the first message and the second information.

In this case, when the message relay is made through the central gateway ECU 200 within a predetermined time after the first ECU 130 and/or the second ECU 140 request the message relay from the central gateway ECU 200, the second ECU 140 may control the steering of the vehicle based on the second information and the first message received from the central gateway ECU 200 through the second vehicle CAN network. On the other hand, when no message relay is made through the central gateway ECU 200 within the predetermined time, the second ECU 140 may determine that the central gateway ECU 200 and/or the first vehicle CAN network is abnormal, and may control the steering of the vehicle based only on the second information.

After the first ECU 130 and/or the second ECU 140 request the message relay from the central gateway ECU 200, the second ECU 140 may control the steering of the vehicle based only on the second information. Then, when the message relay is made through the central gateway ECU 200, the second ECU 140 may control the steering of the vehicle based on the second information and the first message received from the central gateway ECU 200 through the second vehicle CAN network.

Although all of the components configuring the exemplary embodiments of the invention described above are described as being combined or operating in combination, the present disclosure is not necessarily limited to these exemplary embodiments. That is, within the range of the object of the present disclosure, one or more components among all of the constituent elements may also be selectively combined and operated. All of the components may be implemented as separate pieces of hardware, but may also be implemented as a computer program having program modules in which some or all of the components are optionally combined to perform some or all of the combined functions on one or more pieces of hardware. Further, the computer program is stored in a computer readable media, such as a USB memory, a CD disk, and a flash memory, and read and executed by a computer, to implement the exemplary embodiment of the present disclosure. Recording media for computer programs may include magnetic recording media, optical recording media, and the like.

Although the exemplary embodiment of the present disclosure has been described for illustrative purposes, those skilled in the art will appreciate that various modifications, additions and substitutions are possible, without departing from the essential characteristic of the invention. Therefore, the exemplary embodiments disclosed in the present disclosure and the accompanying drawings are not intended to limit the technical spirit of the present disclosure, but are intended to illustrate the scope of the technical idea of the present disclosure, and the scope of the present disclosure is not limited by the exemplary embodiment and the accompanying drawings. The scope of the present disclosure shall be construed on the basis of the accompanying claims in such a manner that all of the technical ideas included within the scope equivalent to the claims belong to the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An Electric Power Steering (EPS) apparatus connected to a central gateway Electronic Control Unit (ECU) mounted in a vehicle, the EPS apparatus comprising:
    a first ECU configured to individually control steering of the vehicle based on first information; and
    a second ECU configured to individually control steering of the vehicle based on second information,
    wherein the first ECU is connected to the central gateway ECU through a first vehicle Controller Area Network (CAN), and is connected to the second ECU through an inter micro CAN (IMC) network,
    wherein the second ECU is connected to the central gateway ECU through a second vehicle CAN network different from the first vehicle CAN network, and is connected to the first ECU through the IMC network,
    wherein the first ECU is configured to:
        receive a second message directly from the second ECU through the IMC network when the IMC network is operated normally;
        receive the second message from the central gateway ECU through the first vehicle CAN network when the IMC network is not operated normally; and
        control the steering of the vehicle based on the second message and the first information,
    wherein the second ECU is configured to:
        receive a first message directly from the first ECU through the IMC network when the IMC network is operated normally;
        receive the first message from the central gateway ECU through the second vehicle CAN network when the IMC network is not operated normally; and
        control the steering of the vehicle based on the first message and the second information,
    wherein the first information includes first channel information received by the first ECU through the first vehicle CAN network, first torsion force information received by the first ECU from a torque sensor, and first motor output information received by the first ECU from a motor,
    wherein the second information includes second channel information received by the second ECU through the second vehicle CAN network, second torsion force information received by the second ECU from the torque sensor, and second motor output information received by the second ECU from the motor,
    wherein the first ECU is configured to:
        transmit the first message including the first channel information, the first torsion force information, and the first motor output information to the second ECU through the IMC network when the IMC network is operated normally; and
        transmit the first message to the central gateway ECU through the first vehicle CAN network when the IMC network is not operated normally, and
    wherein the second ECU is configured to:
        transmit the second message including the second channel information, the second torsion force information, and the second motor output information to the first ECU through the IMC network when the IMC network is operated normally; and
        transmit the second message to the central gateway ECU through the second vehicle CAN network when the IMC network is not operated normally.

2. The EPS apparatus of claim 1, wherein when the IMC network is not operated normally, at least one of the first ECU and the second ECU requests message relay from the central gateway ECU.

3. The EPS apparatus of claim 2, wherein when at least one of the first ECU and the second ECU does not receive a message transmitted from another ECU through the IMC network according to a predetermined cycle, at least one of the first ECU and the second ECU determines that the IMC network is not operated normally.

4. The EPS apparatus of claim 2, wherein when a message received from the another ECU differs from a predetermined message format, at least one of the first ECU and the second ECU determines that the IMC network is not operating normally.

5. The EPS apparatus of claim 2, wherein when the message relay is made through the central gateway ECU within a predetermined time after the message relay is requested to the central gateway ECU, the first ECU controls the steering of the vehicle based on the first information and the second message received from the central gateway ECU through the first vehicle CAN network, and when the message relay is not made through the central gateway ECU within the predetermined time, the first ECU controls the steering of the vehicle based only on the first information, and
when the message relay is made through the central gateway ECU within the predetermined time after the message relay is requested to the central gateway ECU, the second ECU controls the steering of the vehicle based on the second information and the first message received from the central gateway ECU through the second vehicle CAN network, and when the message relay is not made through the central gateway ECU within the predetermined time, the second ECU controls the steering of the vehicle based only on the second information.

6. The EPS apparatus of claim 2, wherein the first ECU controls the steering of the vehicle based only on the first information after the message relay is requested to the central gateway ECU, and when the message relay is made through the central gateway ECU, the second ECU controls the steering of the vehicle based on the first information and the second message received from the central gateway ECU through the first vehicle CAN network, and
the second ECU controls the steering of the vehicle based only on the second information after the message relay is requested to the central gateway ECU, and when the message relay is made through the central gateway ECU, the first ECU controls the steering of the vehicle based on the second information and the first message received from the central gateway ECU through the second vehicle CAN network.

7. The EPS apparatus of claim 1, wherein the first channel information includes speed information of the vehicle, and is different from the second channel information.

8. A method of operating an Electric Power Steering (EPS) apparatus connected to a central gateway Electronic Control Unit (ECU) mounted in a vehicle, the method comprising:
individually controlling, by a first ECU, steering of the vehicle based on first information; and
individually controlling, by a second ECU, steering of the vehicle based on second information,
wherein the first ECU is connected to the central gateway ECU through a first vehicle Controller Area Network (CAN), and is connected to the second ECU through an inter micro CAN (IMC) network,
wherein the second ECU is connected to the central gateway ECU through a second vehicle CAN network different from the first vehicle CAN network, and is connected to the first ECU through the IMC network,
wherein the method further comprises:
receiving, by the first ECU, a second message directly from the second ECU through the IMC network when the IMC network is operated normally;
receiving, by the first ECU, the second message from the central gateway ECU through the first vehicle CAN network when the IMC network is not operated normally;
receiving, by the second ECU, a first message directly from the first ECU through the IMC network when the IMC network is operated normally; and
receiving, by the second ECU, the first message from the central gateway ECU through the second vehicle CAN network when the IMC network is not operated normally,
wherein the controlling by the first ECU is performed based on the second message and the first information,
wherein the controlling by the second ECU is performed based on the first message and the second information,
wherein the first information includes first channel information received by the first ECU through the first vehicle CAN network, first torsion force information received by the first ECU from a torque sensor, and first motor output information received by the first ECU from a motor,
wherein the second information includes second channel information received by the second ECU through the second vehicle CAN network, second torsion force information received by the second ECU from the torque sensor, and second motor output information received by the second ECU from the motor, and
wherein the method further comprises:
transmitting, by the first ECU, the first message including the first channel information, the first torsion force information, and the first motor output information to the second ECU through the IMC network when the IMC network is operated normally;
transmitting, by the first ECU, the first message to the central gateway ECU through the first vehicle CAN network when the IMC network is not operated normally;
transmitting, by the second ECU, the second message including the second channel information, the second torsion force information, and the second motor output information to the first ECU through the IMC network when the IMC network is operated normally; and
transmitting, by the second ECU, the second message to the central gateway ECU through the second vehicle CAN network when the IMC network is not operated normally.

9. The method of claim 8, further comprising:
requesting, by at least one of the first ECU and the second ECU, message relay from the central gateway ECU when the IMC network is not operated normally.

10. The method of claim 9, wherein the requesting of the message relay includes, when at least one of the first ECU and the second ECU does not receive a message transmitted from another ECU through the IMC network according to a predetermined cycle, determining that the IMC network is not operated normally.

11. The method of claim 9, wherein the requesting of the message relay includes, when a message received from the another ECU differs from a predetermined message format, determining that the IMC network is not operating normally.

12. The method of claim 9, wherein the controlling by the first ECU includes, when the message relay is made through the central gateway ECU within a predetermined time after the message relay is requested to the central gateway ECU, controlling the steering of the vehicle based on the first information and the second message received from the central gateway ECU through the first vehicle CAN network, and when the message relay is not made through the central gateway ECU within the predetermined time, controlling the steering of the vehicle based only on the first information, and the controlling by the second ECU includes, when the message relay is made through the central gateway ECU within the predetermined time after the message relay is requested to the central gateway ECU, controlling the steering of the vehicle based on the second information and the first message received from the central gateway ECU through the second vehicle CAN network, and when the message relay is not made through the central gateway ECU within the predetermined time, controlling the steering of the vehicle based only on the second information.

13. The method of claim 9, wherein the controlling by the first ECU includes controlling the steering of the vehicle based only on the first information after the message relay is requested to the central gateway ECU, and when the message relay is made through the central gateway ECU, controlling the steering of the vehicle based on the first information and the second message received from the central gateway ECU through the first vehicle CAN network, and the controlling by the second ECU includes controlling the steering of the vehicle based only on the second information after the message relay is requested to the central gateway ECU, and controlling the steering of the vehicle based on the second information and the first message received from the central gateway ECU through the second vehicle CAN network when the message relay is made through the central gateway ECU.

* * * * *